Oct. 24, 1933.      A. C. ROWLEY      1,932,324
VALVE FOR FIRE EXTINGUISHING SYSTEMS
Original Filed April 24, 1931    3 Sheets-Sheet 1

Inventor:
Arthur C. Rowley
by his Attorneys
Howson & Howson

Oct. 24, 1933.  A. C. ROWLEY  1,932,324
VALVE FOR FIRE EXTINGUISHING SYSTEMS
Original Filed April 24, 1931  3 Sheets-Sheet 2

Oct. 24, 1933.   A. C. ROWLEY   1,932,324
VALVE FOR FIRE EXTINGUISHING SYSTEMS
Original Filed April 24, 1931    3 Sheets-Sheet 3
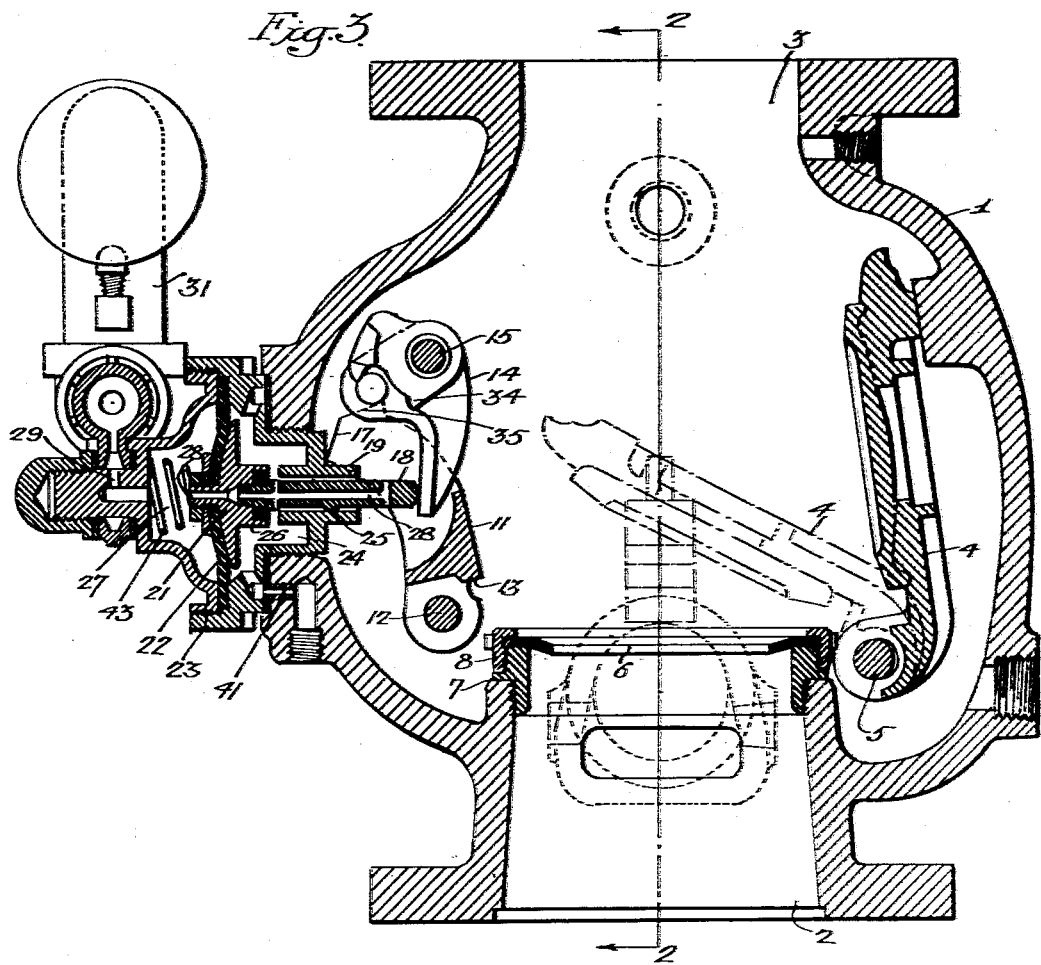
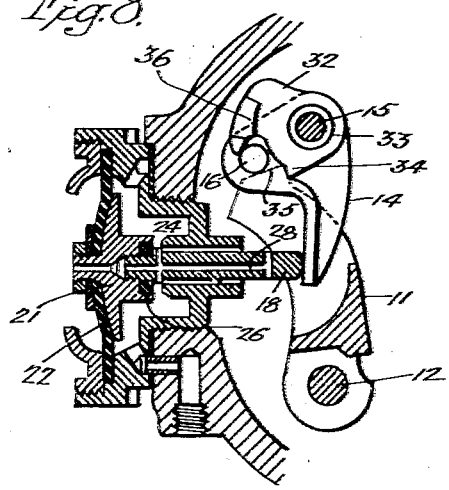
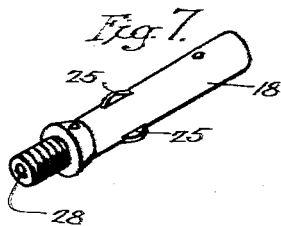
Inventor:
Arthur C. Rowley
by his Attorneys
Howson & Howson Patented Oct. 24, 1933

1,932,324

UNITED STATES PATENT OFFICE 1,932,324

VALVE FOR FIRE EXTINGUISHING SYSTEMS

Arthur C. Rowley, Drexel Hill, Pa., assignor to Globe Automatic Sprinkler Company, Philadelphia, Pa., a corporation of Pennsylvania Original application April 24, 1931, Serial No. 532,571. Divided and this application November 22, 1932. Serial No. 643,923

7 Claims. (Cl. 169—19)

This invention relates to improvements in valves, and more particularly to a type of valve adapted for use in dry pipe fire-extinguishing systems.

An object of the invention is to provide a valve of the stated type that shall be relatively simple in form and of low manufacturing cost.

Another object of the invention is to provide a valve so constructed as to avoid necessity for expensive machine operations in the course of manufacture and which shall be in effect automatically self-seating.

A further object of the invention is to provide a valve of the stated character having novel release means adapting the valve for operation in conjunction with various types of release mechanism and detector systems, as hereinafter more fully described.

Still another object of the invention is to provide a valve which in addition to use in dry pipe systems is also adaptable for use as a deluge valve controlling a system of open sprinklers.

The invention further resides in certain novel and improving structural features and details hereinafter set forth and illustrated in the attached drawings, in which:

Fig. 3 is a sectional view similar to Fig. 1 but showing the valve in an elevated or unseated position;

Figs. 4, 5, 6 and 7 are views in perspective of elements of the latching mechanism;

Fig. 8 is a fragmentary sectional view illustrating the operation of a detail of the mechanism.

Figure 1:
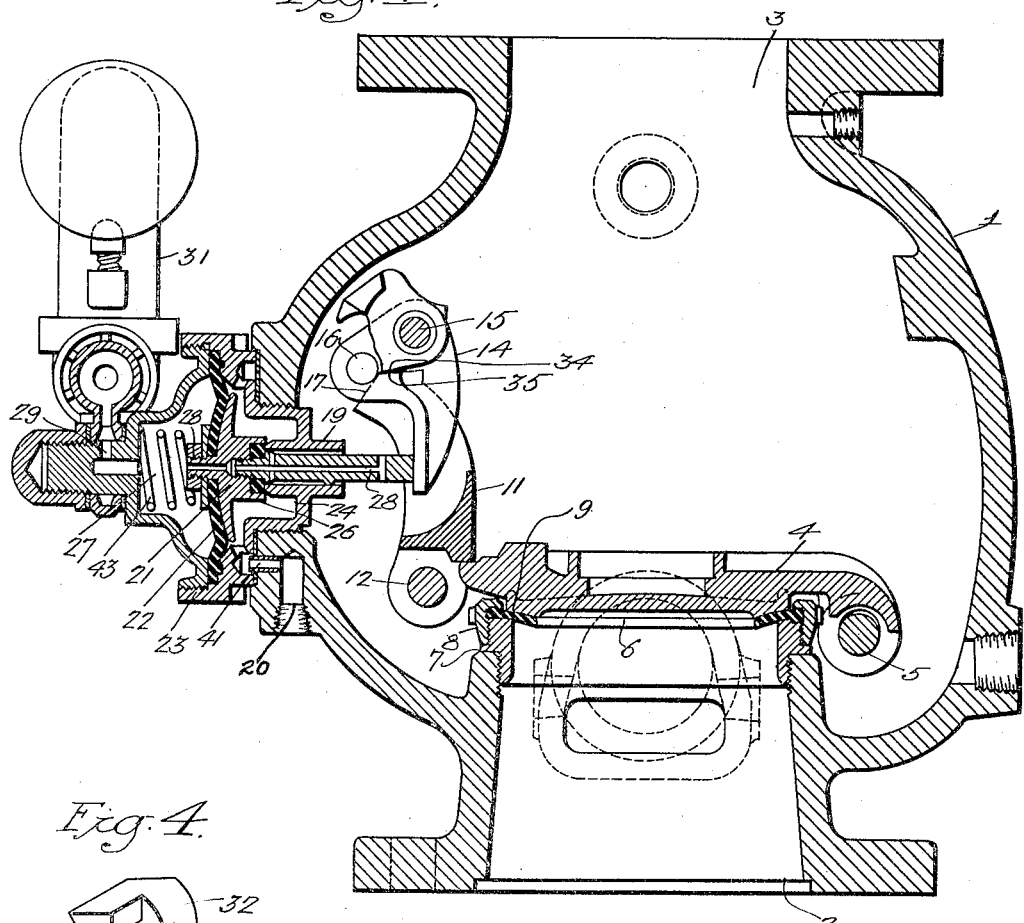
Figure 1 is a sectional view of a valve made in accordance with my invention showing the valve seated.
Figure 4:
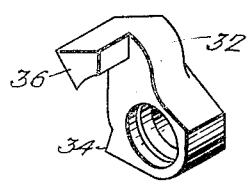
Figure 5:
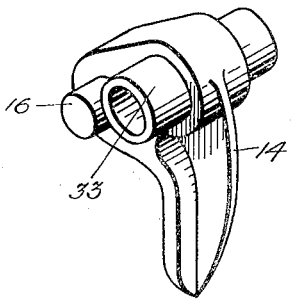
Figure 6:
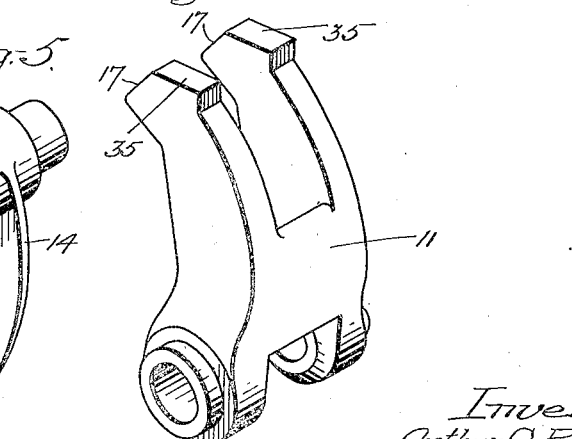

With reference to the drawings, a valve made in accordance with my invention comprises a casing 1, this casing having a port 2 adapted for connection to a water main and a port 3 for connection with a dry pipe or other fire-extinguishing system. The port 2 is normally closed by a valve comprising a clapper 4 pivotally mounted at 5 within the casing, this clapper normally resting upon a rubber or other suitable annulus 6 which constitutes the valve seat. In the present instance, the element 6 is confined between a sleeve 7 threaded into the casing at the upper end of the port 2 and a flange 8 which is threaded onto the said sleeve 7. The clapper is provided on its under side with an annular surface 9 which is adapted to rest snugly against the annulus 6 as illustrated in Fig. 1, thereby effectively closing the port 2.

In accordance with my invention, the valve clapper 4 is provided with a positive locking means, this means comprising in the present instance a bifurcated lever 11, pivotally mounted within the housing upon trunnions 12, this lever having a shoulder 13 which is adapted in predetermined position of the lever, as shown in Fig. 1, to overlie the edge of the clapper 4 to thereby hold the latter securely in the seated or port-closing position. To normally retain the lever 11 in the said clapper-locking position, I provide a latch element 14 which is pivotally mounted upon a rod 15 within the housing and which has at each side a transversely projecting pin 16 which by engaging the terminal faces 17 of the two arms of the lever 11 hold the latter in the upright or clapper-locking position, see Fig. 1. The latch 14 is normally retained in the lever-locking position by a plunger 18 slidably mounted in a boss 19 in the housing, the outer end of the plunger 18 being threaded into an element 21 which is attached to a flexible diaphragm 22 secured at its periphery in a casing extension 23. The extension 23 which includes the boss 19 forms in effect a chamber distinct from the main casing chamber and divided by the flexible diaphragm 22. That portion of the chamber immediately adjacent the housing and designated by the reference numeral 24 is constantly in communication with the atmosphere through a port 20, and is adapted for communication with the main casing chamber through a passage formed between the outer surface of the plunger 18 and the inner surface of the boss 19, the plunger 18 being of lesser diameter than the guide passage in the boss 19 in which it operates, and it will be noted further by reference to Fig. 7 that the plunger 18 is provided with projections 25 which act to center the plunger in the said guide passage. The chamber 24 is normally separated from the main valve chamber, however, by the element 21 which is adapted to function as a valve closing the inner end of the guide passage through the boss 19. For this purpose, the inner end of the member 21 is provided with a rubber or other suitable insert 26 which engages the outer end of the boss 19 and forms a seal therewith.

The outer portion of the chamber in the subcasing 3, designated by the reference numeral 27, is normally in communication with the main valve chamber of the casing 1 through a passage 28 which extends through the plunger 18 and continues through the member 21. The subchamber 27 is also adapted for connection through a port 29 with pressure release means, one form of which is indicated generally at 31, whereby the pressure in the chamber 27 may be exhausted for a purpose hereinafter set forth.

Figure 2:
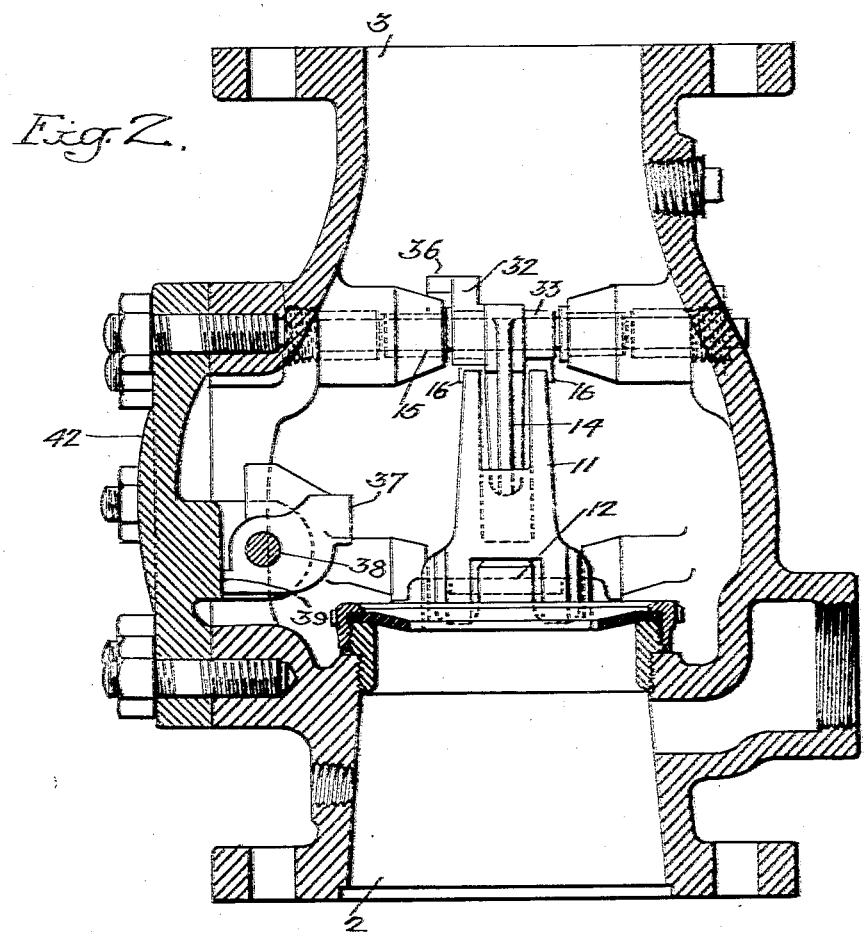
Fig. 2 is a sectional view on the line 2—2, Fig. 3.

Also for a purpose hereinafter made clear, an auxiliary latch 32 is mounted upon one of the cylindrical bearing bosses 33 of the latch 14, the element 32 normally assuming a position as shown in Figs. 1 and 2 wherein the lower projecting portion 34 rests upon the terminal end surface 35 of one of the arms of the lever 11. The element 32 also has a transverse projection 36 which when the element is depressed is adapted to engage the underlying pin 16 of the latch 14, as shown in Figs. 3 and 8, this depressed position of the element 32 bringing the projection 34 into a position wherein it lies in the path of the upper end of one of the arms of the lever 11 and acts as a stop limiting the movement of this lever towards the clapper. Another latch is provided, see Fig. 2, for preventing the clapper, when the latter is once fully opened as shown in Fig. 3, from falling back to its seat, this latch which is designated by the reference numeral 37 being pivotally mounted within the casing at 38 in the path of the clapper. The latch is free to turn in the counter-clockwise direction, see Fig. 2, to permit passage of the clapper in opening, but is prevented from moving in the reverse direction by a shoulder 39 which engages the side of the casing. This latch is supported by gravity in the position shown in Fig. 2, and as set forth above prevents return of the clapper to its seat following actuation.

In operation of the valve in conjunction with a dry pipe system, the valve chamber above the clapper is filled with air under pressure, which air also fills the dry pipe system, which as previously set forth communicates with the port 3. This pressure is transmitted through the passage 28 of the plunger 18 and the member 21 to the chamber 27, but is prevented from reaching the chamber 24 by the valve 26. The chamber 24 being in communication with the atmosphere or other low pressure exhaust area, the pressure in the chamber 27 acting upon the diaphragm 22 holds the latter in an advanced position as shown in Fig. 1, closing the passage through the boss 19 and through the plunger 18 holding the latch in the advanced position locking the lever 11 in the position shown in Fig. 1 in which it holds the clapper 4 to its seat. The air pressure exerted directly upon the clapper 4 and upon the latching mechanism through the diaphragm 22 and the associated parts is sufficient to prevent opening of the clapper under pressure from the water main applied through the port 2. If now the pressure in the chamber 27 is exhausted at a rate more rapid than the transfer of pressure from the valve casing to the chamber 27 through the restricted passage 28, the resulting relative reduction of pressure in the chamber 27 permits a retractive movement of the diaphragm 22 and release of the latch 14, such release permitting in turn a retractive movement of the lever 11 and release of the clapper 4, which is thrown by pressure of the entering water to the position shown in Fig. 3, the latch 37 functioning as previously set forth to prevent reseating of the clapper.

Following actuation of the valve as described above, return of the lever 11 to its original position is also prevented by the auxiliary latch 32, which when the lever 11 is originally withdrawn as illustrated in Fig. 3 drops by gravity to a position in which the shoulder of the projection 34 lies in the path of the extremity of the lever 11, see Fig. 8, whereby any rebound of this lever tending to throw it inwardly is checked. The pins 16 of the latch 14 following release of the clapper assume a position resting upon the terminal surfaces 35 of the lever 11 which maintains the latch 14 in a position permitting easy return of the lever 11 to its original position when the mechanism is to be reset. For resetting purposes, the casing is provided with a detachable head 42 which affords access to the latch 37 whereby this latch may be retracted to permit reseating of the clapper. Access is also afforded to the auxiliary latch 32 to permit elevation of this element to its original position and return of the lever 11 to the normal locking position.

Following readjustment of the various locking elements into their proper relative positions, the plunger 18 and diaphragm 22 being returned to the normal advanced position through the medium of a spring 43, see Fig. 1, air is admitted to the system at an adequate pressure, and subsequently the water in the main admitted to the port 2, whereupon the device is prepared for further operation.

The valve is adapted for actuation to release the clapper 4 in a number of different ways, and in this respect is highly adaptable to practically all systems of fire control. The valve may be released for example by simple loss of air pressure in the sprinkler system due to an open sprinkler head, and the release action may be accelerated by association with the chamber 27 of a suitable accelerator actuated by the initial loss of air in the system. The valve is adapted for actuation by quick release of air pressure from the chamber 27 through the medium of a suitable quick-acting valve operating in conjunction with a detector system paralleling the sprinkler heads, such a system being illustrated in my co-pending application Serial Number 314,511, or a valve controlling the pressure in the chamber 27 may be associated with an electric motor energized by movement of thermostats distributed over the area covered by the system. Also as previously set forth, the valve may be utilized for deluge purposes with a system of open sprinklers, and in this connection the valve may be released manually or thermostatically. For this latter purpose, a small pipe may establish connection between the water supply main below the valve 4 and the chamber 27, the passage 28 in this case being closed to prevent seepage of water into the system. Release of water pressure in the chamber 27 will permit opening of the valve 4. There is to be no limitation, however, as to the means of operation. Particular attention is directed to the novel method of seating the clapper 4 upon a rubber or other suitable element which eliminates the necessity for close machining of the parts to effect a tight seat, and thereby affords a considerable economy in manufacture.

Figure 9:
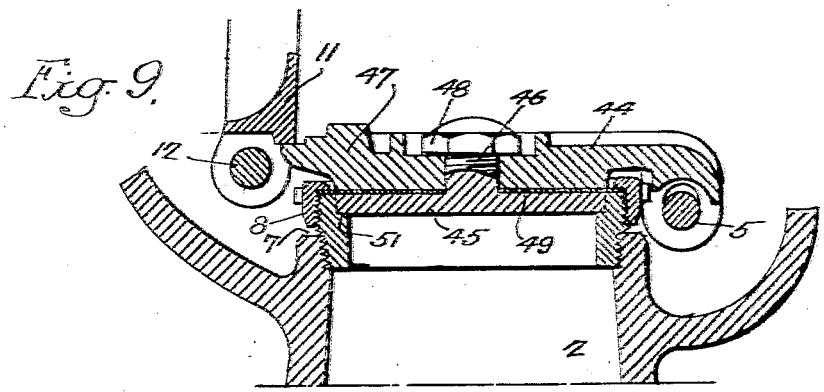
Fig. 9 is a fragmentary sectional view illustrating a modification within the scope of the invention.

In Fig. 9, I have illustrated a modification of the valve in which the clapper 44 comprises a nether portion 45 in the form of a disk having a stud 46 adapted to project through an opening in the body 47 of the clapper, a nut 48 being provided to draw the disk 45 tightly against the face of the body 48 so as to confine between these parts a rubber or other flexible disk 49, this disk being apertured to permit passage therethrough of the stud 46. As with the annular element 6 of the previously described embodiment, the peripheral portion of this disk is confined between the sleeve 7 and flange 8 of the valve housing. The disk 49 forms a gasket between the clapper elements 45 and 47 and between the sleeve 7 and flange 8 so that the port embraced by the sleeve 7 is tightly sealed. A seat for the clapper is provided by a shoulder 51 on the sleeve 7. When the clapper is released by the means previously described, the pressure of the water under the clapper is sufficient to rupture the disk 49 intermediate the clamp peripheral portion and the periphery of the valve clapper, thereby permitting the clapper to swing back on its pivot to uncover the port. Resetting of the valve involves replacement of the portions of the ruptured disk 49 by a new disk. This form of valve has the advantages of cheapness and simplicity of manufacture as previously set forth.

There may be other modifications without departure from the invention.

I claim:

1. A valve of the character set forth, comprising a main casing and a sub-casing, a valve mounted in said main casing, and a seat for said valve, a diaphragm dividing said sub-casing, a plunger secured to said diaphragm and constituting an element of mechanism for releasably holdng said valve element to its seat, a passage in said plunger providing connection between the interior of the main casing and the sub-casing at that side of said diaphragm on which applied pressure will tend to hold the plunger in the valve-seating position, the space at the other side of said diaphragm being connected with the atmosphere, a passage establishing communication between the last-named space and the interior of the main casing, and means associated with said plunger for normally closing said last-named passage, said passage being opened by retraction of the plunger in releasing the valve element.

2. A valve of the character set forth comprising a main casing and a sub-casing, a valve mounted in said main casing, and a seat for said valve, a diaphragm dividing said sub-casing, a plunger secured to said diaphragm and constituting an element of mechanism for releasably holding said valve element to its seat, a passage in said plunger providing connection between the interior of the main casing and the sub-casing at that side of said diaphragm on which applied pressure will tend to hold the plunger in the valve-seating position, the space at the other side of said diaphragm being connected with the atmosphere, said plunger extending through a port from the sub-casing into the main casing and loosely fitting said port to provide a passage around the plunger extending from the interior of the main casing to the space within the sub-casing communicating with the atmosphere, and means movable with the plunger and adapted to overlie one end of said port for normally closing the last-named passage, said passage being opened by retraction of the plunger in releasing the valve element.

3. In a valve of the character set forth, a casing having a valve chamber, a pressure chamber and a third chamber normally connected to atmosphere, a passage connecting the valve chamber with the third chamber, a flexible diaphragm separating the said pressure chamber from the third chamber, means establishing restricted communication between the said valve and pressure chambers, a main valve adapted to seat in the valve chamber, a second valve adapted to close the said passage, and means for operatively connecting both of said valves with the diaphragm whereby said valves are held closed by pressure in the pressure chamber.

4. In a valve of the character set forth, a casing having a valve chamber, a pressure chamber and a third chamber normally connected to atmosphere, a passage connecting the valve chamber with the third chamber, a flexible diaphragm separating the said pressure chamber from the third chamber, means establishing restricted communication between the said valve and pressure chambers, a main valve adapted to seat in the valve chamber, a second valve connected with the diaphragm and adapted to close the said passage, latching mechanism for retaining the main valve to its seat, and means operatively connected with the diaphragm for controlling said latching mechanism, said diaphragm being operative under pressure within the pressure chamber to maintain said latching mechanism in operative position with respect to the main valve and to seat the said second valve to close the said passage.

5. In a valve of the character set forth, a casing having a valve chamber, a pressure chamber and a third chamber normally connected to atmosphere, a passage connecting the valve chamber with the third chamber, a flexible diaphragm separating the said pressure chamber from the third chamber, means establishing restricted communication between the said valve and pressure chambers, a main valve adapted to seat in the valve chamber, a second valve adapted to close the said passage, means for operatively connecting both of said valves with the diaphragm whereby said valves are held closed by pressure in the pressure chamber, and a spring operative to maintain the diaphragm normally in the advanced valve-closing position.

6. In a valve of the character set forth, a casing having a valve chamber, a pressure chamber and a third chamber normally connected to atmosphere, a passage connecting the valve chamber with the third chamber, a flexible diaphragm separating the said pressure chamber from the third chamber, means establishing restricted communication between the said valve and pressure chambers, a plunger operatively associated with the diaphragm and extending loosely through the said passage into the valve chamber, a main valve adapted to seat in said valve chamber, latching mechanism for holding said main valve normally to its seat, the said diaphragm being operative through the plunger and by pressure in the pressure chamber to maintain the latching mechanism in operative position with respect to the valve, and a second valve operatively associated with the diaphragm and adapted when the diaphragm is in the latch-retaining position to close the said passage to thereby prevent escape of pressure from the valve chamber to the third chamber.

7. A valve of the character set forth comprising a main valve chamber, a valve element mounted in said chamber, and a seat for said element, means for releasably holding the valve element to its seat including a main lever adapted to be detachably interlocked with said element, a latching lever for the main lever, and retractible means for retaining said latching lever in operative relation to said main lever, and a supplemental latching element adjustably mounted on said latching lever and operative following release of said main lever for limiting movement of said main lever toward its normal valve-locking position.

ARTHUR C. ROWLEY.